United States Patent
Miyoshi (10) Patent No.: US 7,513,144 B2
(45) Date of Patent: Apr. 7, 2009

(54) PNEUMATIC TIRE WITH SPECIFICALLY ARRANGED STRAIN SENSORS

(75) Inventor: Akihiro Miyoshi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/980,490

(22) Filed: Oct. 31, 2007

(65) Prior Publication Data

US 2008/0127753 A1    Jun. 5, 2008

(30) Foreign Application Priority Data

Nov. 7, 2006    (JP)    ............................. 2006-301877

(51) Int. Cl.
*G01M 17/02* (2006.01)
(52) U.S. Cl. ......................................... 73/146; 340/442
(58) Field of Classification Search ........ 73/146–146.8; 340/442–447
See application file for complete search history.

(56) References Cited

U.S. PATENT DOCUMENTS

| 5,864,056 A * | 1/1999 | Bell et al. ...................... 73/146 |
| 7,199,880 B2 * | 4/2007 | Braghiroli ................... 356/601 |
| 7,249,498 B2 | 7/2007 | Miyoshi et al. |
| 7,404,317 B2 * | 7/2008 | Mancosu et al. .............. 73/146 |
| 7,412,879 B2 * | 8/2008 | Serra et al. ..................... 73/146 |
| 7,418,362 B2 * | 8/2008 | Shiraishi ..................... 702/146 |

* cited by examiner

*Primary Examiner*—Andre J Allen
*Assistant Examiner*—Jermaine Jenkins
(74) *Attorney, Agent, or Firm*—Birch, Stewart, Kolasch & Birch, LLP (57) ABSTRACT

A pneumatic tire comprises a tread portion, a pair of bead portions and a pair of sidewall portions, and at least one of the sidewall portions is provided with at least three strain sensors disposed at least three circumferentially different mounting positions, respectively. The at least three strain sensors are oriented at angles θ with respect to tire radial directions at the respective mounting positions. The orientation angles θ of at least two of the at least three strain sensors are different from one another and their difference(s) is(are) not less than 20 degrees in absolute value.

9 Claims, 8 Drawing Sheets

PNEUMATIC TIRE WITH SPECIFICALLY ARRANGED STRAIN SENSORS

BACKGROUND OF THE INVENTION

The present invention relates to a pneumatic tire, more particularly to an arrangement of strain sensors fixed to a tire sidewall portion capable of improving the precision of determining tire force.

In recent years, in order to assure the safety, stability and the like of the vehicles, various computer-aided control systems for the vehicles, e.g. ABS (Anti Lock Brake System), TCS (Traction control system), VSC (vehicle stability control system) and the like have been developed and in practical use.

In such vehicle control systems, it is very important to correctly know various conditions of the rolling tires in real time under ever-changing driving situation. For that purpose, it is especially useful to know a longitudinal force, a lateral force and a vertical force, namely, three translational forces in the back-and-forth direction, right-and-left direction and up-and-down direction, applied to the ground contacting patch of the tire during running.

Figure 12:
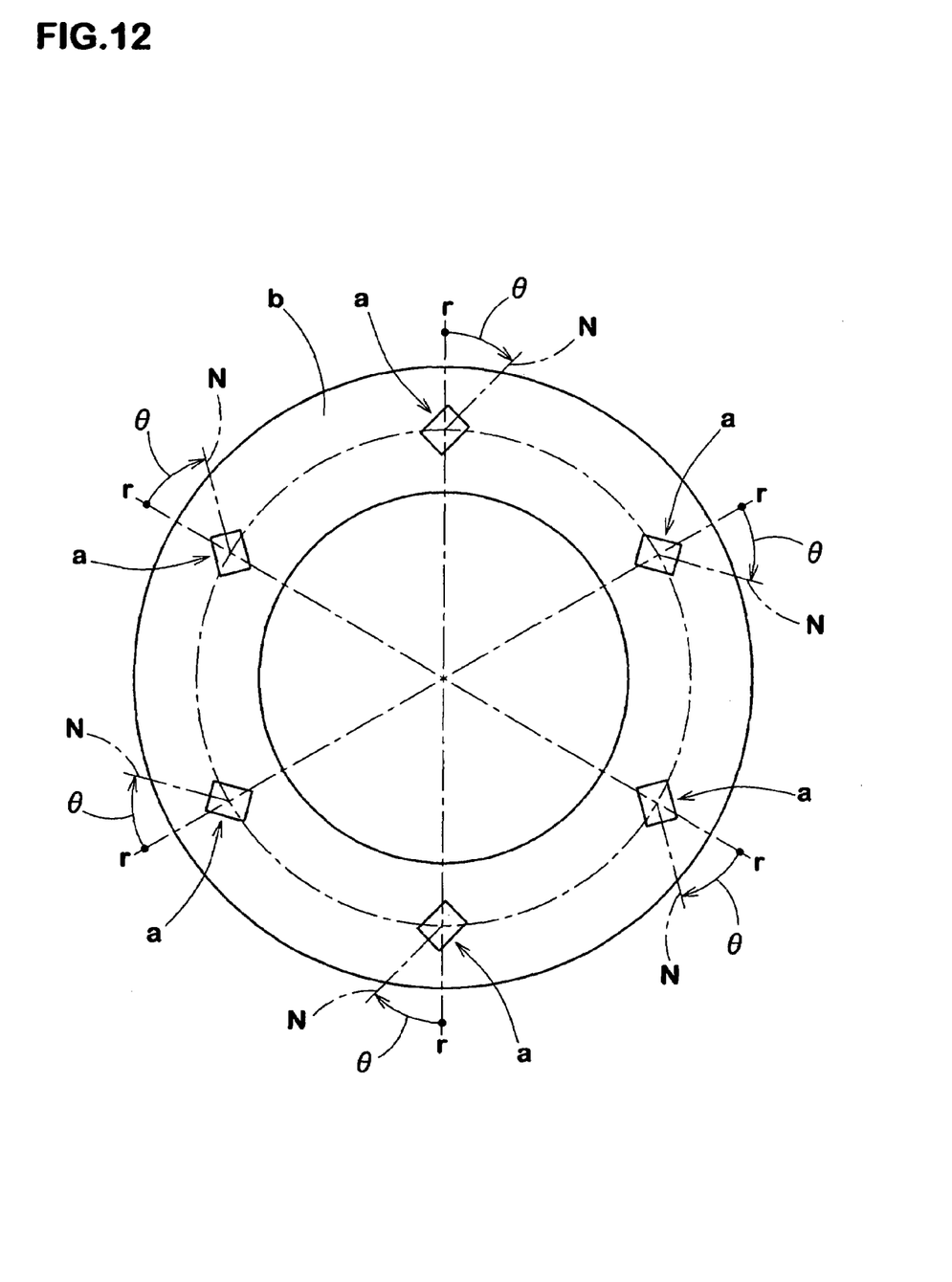
FIG. 12 shows a sensor arrangement according to prior art.

In the U.S. Pat. No. 7,249,498, we proposed a technique for determining the above-mentioned tire forces of a rolling tire by utilizing the deformation of the tire itself, wherein the strain of the tire is measured at circumferentially different fixed measuring positions, using strain sensors fixed to a sidewall portion of the tire, and the tire force is calculated, using the obtained data on the strain. Usually, a strain sensor has a directivity due to the geometrical structure thereof, and it has the most sensitive direction N to the strain. Therefore, in the above-mentioned technique, all of the sensors are oriented toward the same directions. The term "same directions" means that, as shown in FIG. 12, in a tire sidewall portion (b), the directions N of the sensors (a) are inclined towards one circumferential direction at the same angle θ (inclusive of 0 degree) with respect to the respective radial directions (r) at the positions of the sensors.

In the process of improving the accuracy of the calculated tire force, it was found that in particular combinations of the measuring position, the orientation angle, the radial position of the sensors and the type of the sensors, with respect to a tire force, correlation between outputs of the sensors becomes very strong, and as a result, it becomes difficult to decompose the force applied to the tire into the required force components, and the degree of accuracy is decreased.

SUMMARY OF THE INVENTION

It is therefore, an object of the present invention to provide a pneumatic tire with specifically arranged strain sensors by which the correlation in question is lessened and the predictive accuracy of the tire force can be improved.

In the present invention, the term "tire force" is meant to at least three translational forces: longitudinal force Fx, lateral force Fy, and vertical force Fz applied to the tire in the ground contacting patch. Aside from these forces, various forces, e.g. a torque around the tire rotational axis, a torque around a vertical axis passing through the center of the tire and the like can be included.

According to the present invention, a pneumatic tire comprises a tread portion, a pair of bead portions and a pair of sidewall portions, and at least one of the sidewall portions is provided with at least three strain sensors disposed at least three mounting positions, respectively, the at least three mounting positions are arranged around the tire rotational axis at intervals in the tire circumferential direction, the at least three strain sensors are oriented at angles θ with respect to tire radial directions at the respective mounting positions, wherein the orientation angle θ is defined as being a plus value when oriented towards one tire circumferential direction, and a minus value when oriented towards the other tire circumferential direction, the orientation angles θ of at least two of the at least three strain sensors are different from one another and their difference(s) is(are) not less than 20 degrees in absolute value.

DESCRIPTION OF THE PREFERRED EMBODIMENTS

Embodiments of the present invention will now be described in detail in conjunction with accompanying drawings.

Figure 1:
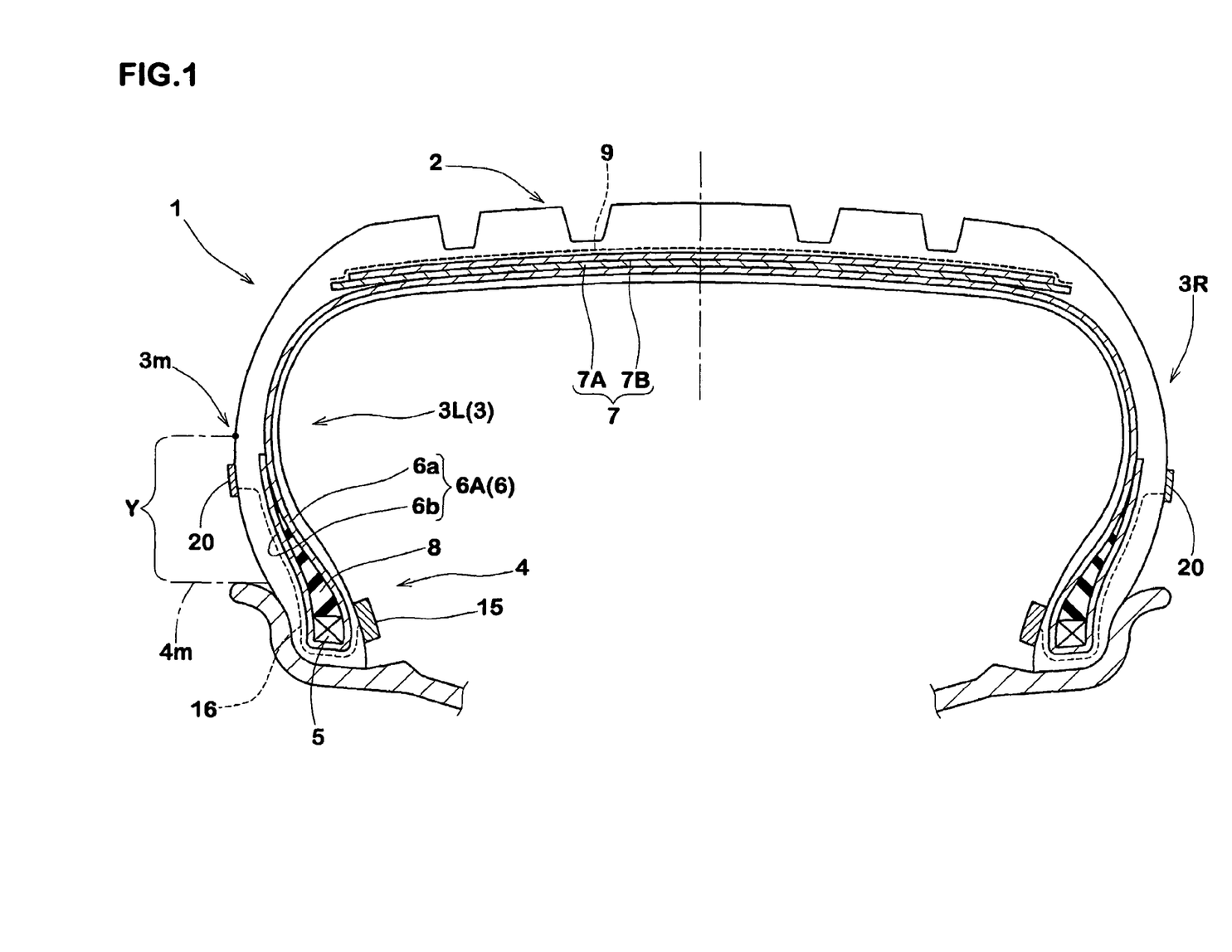
FIG. 1 is a cross sectional view of a pneumatic tire according to the present invention.

In FIG. 1, pneumatic tire 1 according to the present invention comprises a tread portion 2, a pair of sidewall portions 3, a pair of bead portions 4 each with a bead core 5 therein, a carcass 6 extending between the bead portions, and a tread reinforcing layer disposed radially outside the carcass 6 in the tread portion 2.

The carcass 6 is composed of at least one ply 6A, in this example only one ply, of cords arranged radially at angle of 70 to 90 degrees with respect to the tire circumferential direction, and extending between the bead portions 4 through the tread portion 2 and sidewall portions 3, and turned up around the bead core 5 in each bead portion 4 from the inside to the outside of the tire so as to form a pair of turned up portions 6b and one main portion 6a therebetween. Between the main portion 6a and each of the turned up portions 6b, in order to reinforce the bead portion, there is disposed a bead apex 8 extending radially outwardly from the bead core 5 while tapering towards the radially outer end.

The tread reinforcing layer is composed of a belt layer 7 and an optional band 9. The belt layer 7 comprises two cross breaker plies 7A and 7B of cords laid at angles in a range of 10 to 35 degrees with respect to the tire circumferential direction. The band 9 is disposed on the radially outside of the belt layer 7, wherein the band is made of at least one cord whose angle is not more than 5 degrees with respect to the circumferential direction.

According to the present invention, at least one of the sidewall portions 3 is provided with at least one set of strain sensors 20 the number of which is at least three.

Figure 2:
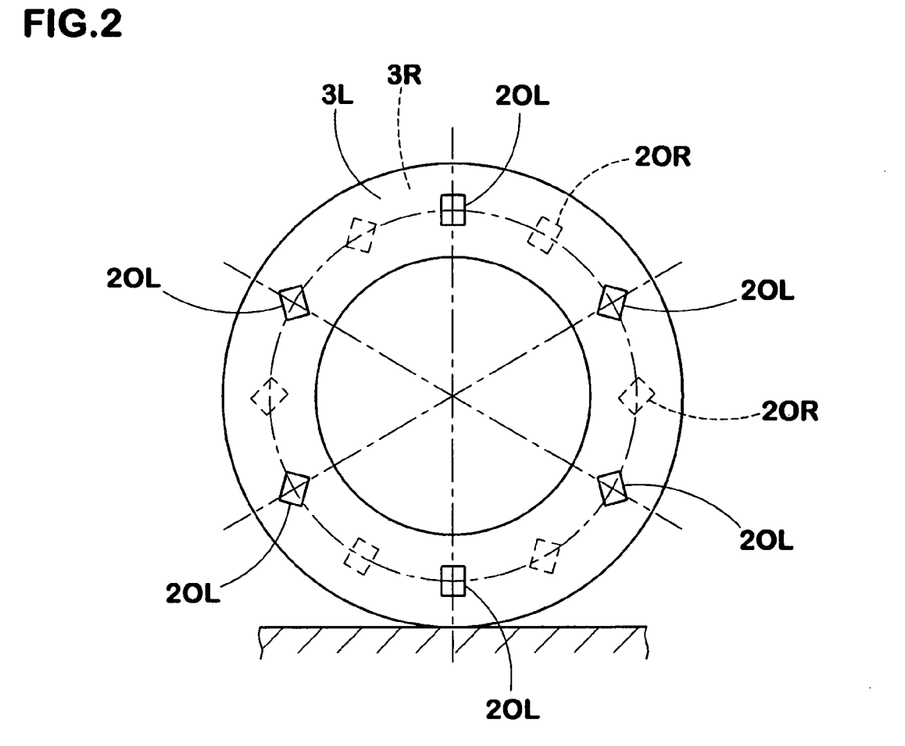
FIG. 2 is a schematic side view of the tire showing an arrangement of the strain sensors.

The strain sensors 20 constituting one set (one set means the sensors provided on one or each sidewall portion) may be arranged around the tire rotational axis at irregular intervals. Further, they may be disposed at different radial distances from the tire rotational axis. But, in view of simplicity of data processing, it is preferable that they are arranged at regular intervals and at the same radial distances from the tire rotational axis as shown in FIG. 2.

When the tire (ground contacting patch) is subjected to a longitudinal force Fx and/or an vertical force Fz, strain of one of the sidewall portions 3 at a measuring position becomes substantially same as strain of the other sidewall portion 3 at the corresponding measuring position. However, when the tire is subjected to a lateral force Fy, a relatively large difference in the strain is caused between the sidewall portions 3, therefore, in order to precisely determine the forces Fx, Fy and Fz in the three translational directions, it is preferred that one of the sidewall portions 3 (3L) is provided with one set of strain sensors 20 (20L), and the other sidewall portion 3 (3R) is also provided with another set of strain sensors 20 (20R).

In respect of the number of the strain sensors 20 per a set, the two sets can be different from each other, but usually, the two sets are the same in the sensor number.

In the case that the sidewall portions are each provided with one set of strain sensors 20, it is desirable that, in terms of the circumferential positions, the strain sensors 20L on one of the sidewall portions 3L are disposed between the strain sensors 20R on the other sidewall portion 3R.

Figure 3:
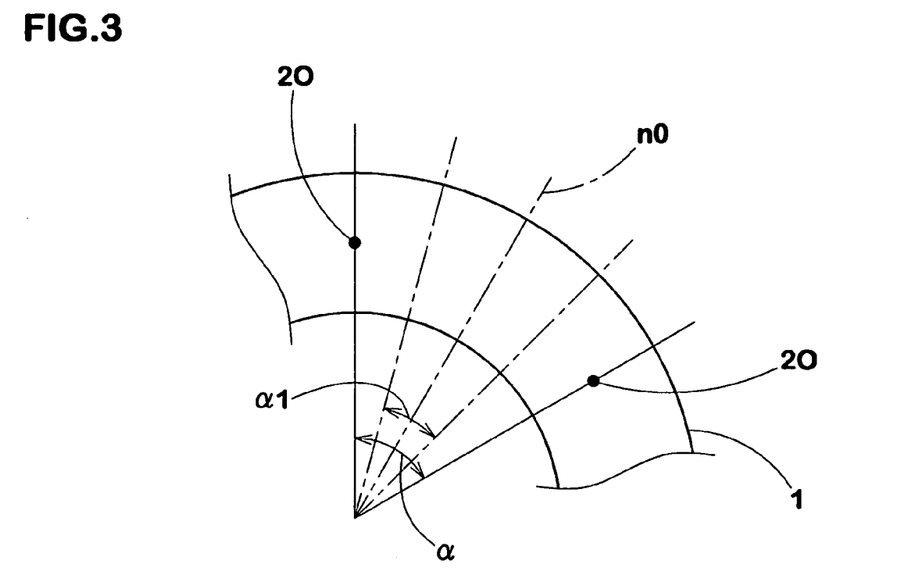
FIG. 3 is a schematic partial side view of a tire for explaining the circumferential positions of the strain sensors disposed on one of the sidewall portions in relation to those of the strain sensors disposed on the other sidewall portion.

More specifically, as shown in FIG. 3, each strain sensor 20L on one sidewall portion 3L is disposed in an angular range α1 around the tire rotational axis, of not more than 50%, preferably not more than 30% of an angle α, wherein the angular range α1 is centered on the bisector line n0 of the angle α around the tire rotational axis between the circumferentially adjacent strain sensors 20 on the other sidewall portion 3R.

In the example shown in FIG. 2, each of the sidewall portions 3 is provided with six strain sensors 20 at regular intervals of 60 degrees, and the six strain sensors on one side are sifted by 30 degrees from those on the other side. All of the twelve strain sensors are disposed at the same radial distance from the tire rotational axis.

In a radial range Y between the maximum tire section width position 3m and a position 4m substantially corresponding to the upper end of the flange of the wheel rim for the tire, a variation of a force F applied to the tire and the resultant variation of the strain caused in the sidewall portion have almost linear functionality. Therefore, when the mounting positions are set in the radial range Y, it becomes easiest to accurize the determination of the forces. Accordingly, it is preferable that the mounting positions to which the strain sensors 20 are fixed, are set in this range Y.

In the prior art, all of the strain sensors disposed on a sidewall portion are oriented toward the same directions with respect to the respective tire radial directions.

In the present invention, however, all of the strain sensors 20 constituting one set are not oriented toward the same directions with respect to the respective tire radial directions.

Figure 4:
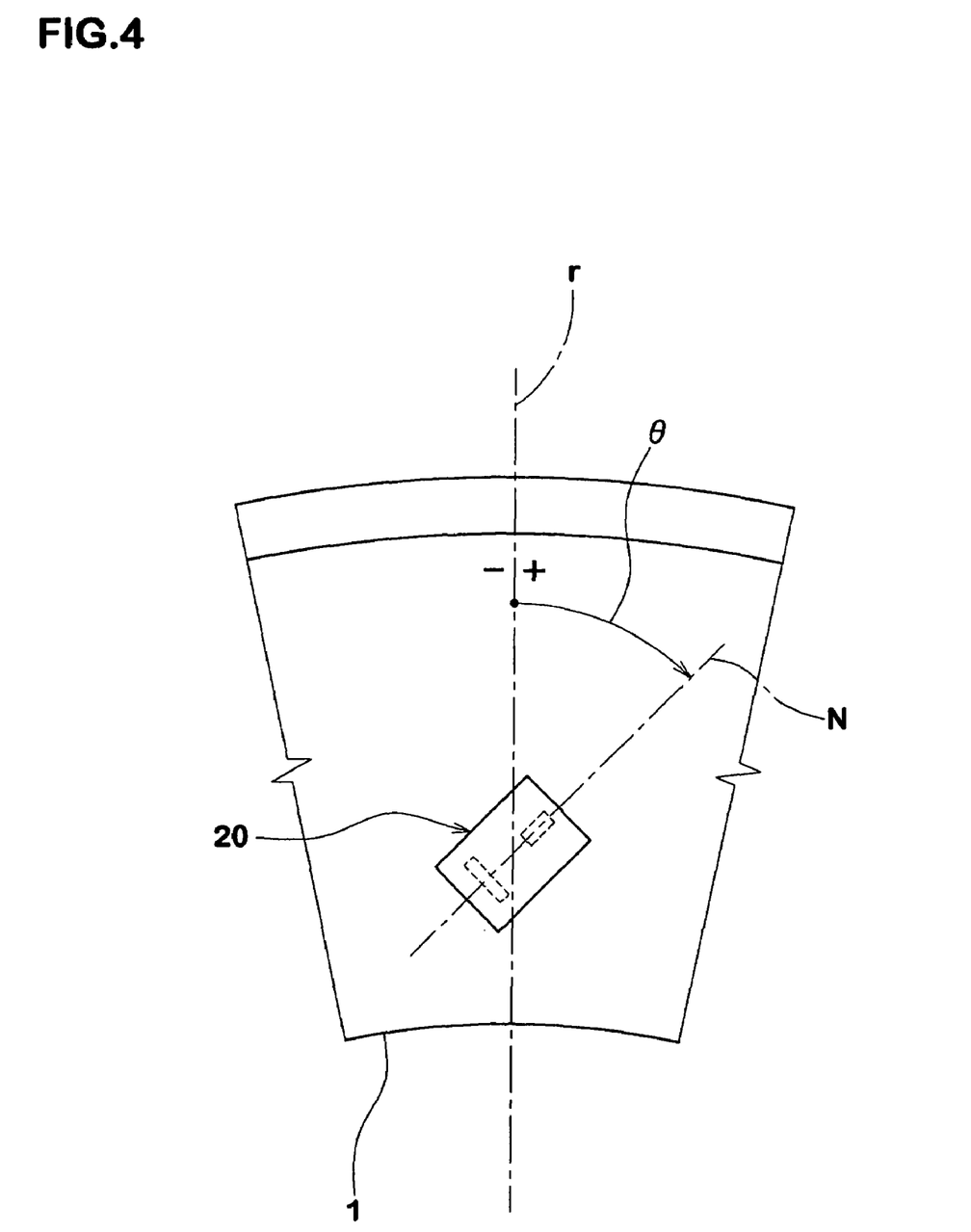
FIG. 4 is a side view for explaining a definition of the orientation angle of a strain sensor.

The strain sensor 20 has a directivity regarding the kind of the strain to be detected and it has the most sensitive direction N. As shown in FIG. 4, the angle θ of the strain sensor 20 is defined as an angle between the most sensitive direction N and the tire radial direction (r) at the mounting position to which the sensor 20 is fixed, wherein the value of the angle is plus when the most sensitive direction N is inclined to one circumferential direction (a clockwise direction in FIG. 4), and the value of the angle is minus when inclined to the other circumferential direction (a counterclockwise direction in FIG. 4).

According to the present invention, at least two, preferably at least three of the strain sensors 20 constituting one set have different orientation angles θ, and the difference(s) between the different angles θ is/are set in a range of not less than 20 degrees in the absolute value.

Figure 5:
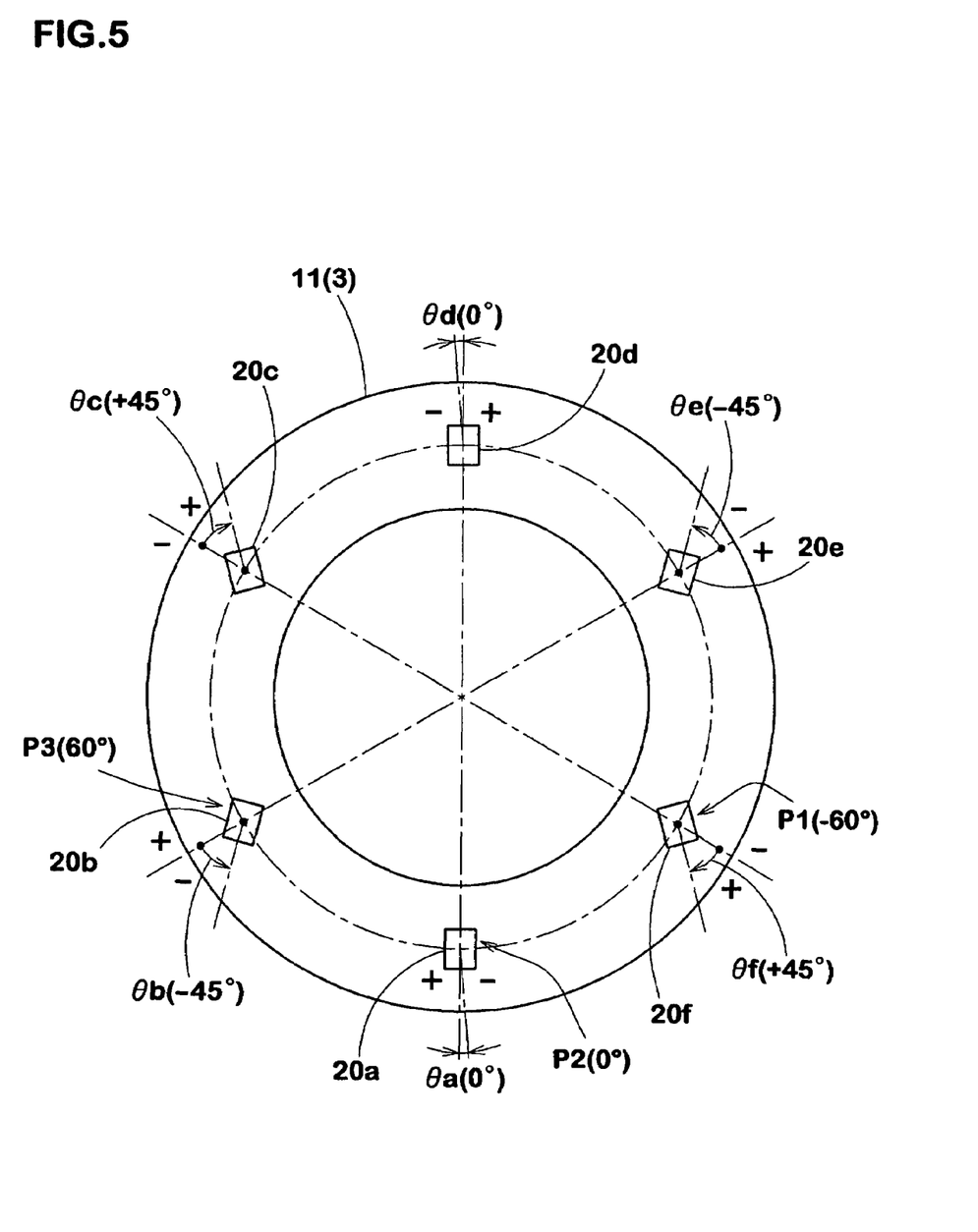
FIG. 5 is a side view showing an exemplary combination of the orientation angles of the strain sensors disposed on one sidewall portion.

For example, in the case of FIG. 5 showing six strain sensors 20(20a-20f) provided on a sidewall portion, the orientation angles θa to θf thereof are as follows:

θa=0 degrees, θb=−45 degrees,
θc=+45 degrees, θd=0 degrees,
θe=−45 degrees, θf=+45 degrees.

Accordingly, |0−(−45)|=45 degrees, |0−(+45)|=45 degrees, and |(−45)−(+45)|=90 degrees. All of the differences are more than 20 degrees in the absolute value.

By differentiating two or more angles θ, the correlation between the strain sensors 20 is lessened, and the precision of resolution of the forces can be improved.

Further, it is preferable that, in the strain sensors 20 constituting one set, the absolute value of the difference in the orientation angle θ between the circumferentially adjacent any two strain sensors 20 is set in a range of not less than 30 degrees in order to reduce the correlation more.

In the case of FIG. 5,
|θa−θb|=45 degrees, |θb−θc|=90 degrees,
|θc−θd|=45 degrees, |θd−θe|=45 degrees,
|θe−θf|=90 degrees, |θf−θa|=45 degrees.

All of the differences are more than 30 degrees in the absolute value.

Furthermore, it is preferable for the same reason that, with respect to each of the strain sensors 20 constituting one set, the remainder of the strain sensors 20 includes zero or only one strain sensor whose angle difference therefrom is less than 20 degrees in the absolute value. In the case of FIG. 5, with respect to the sensor 20a, only one sensor 20d has a difference (zero degree) less than 20 degrees; with respect to the sensor 20b, only one sensor 20e has a difference (zero degree) less than 20 degrees; and with respect to the sensor 20c, only one sensor 20f has a difference (zero degree) less than 20 degrees.

If the angle θ of the strain sensor 20 comes close to −90 or +90 degrees, the output of the sensor becomes very small and not linear. Therefore, the angle θ of each of the strain sensors 20 is set in a range of from −80 to +80 degrees, preferably −70 to +70 degrees, more preferably −60 to +60 degrees.

Figure 6:
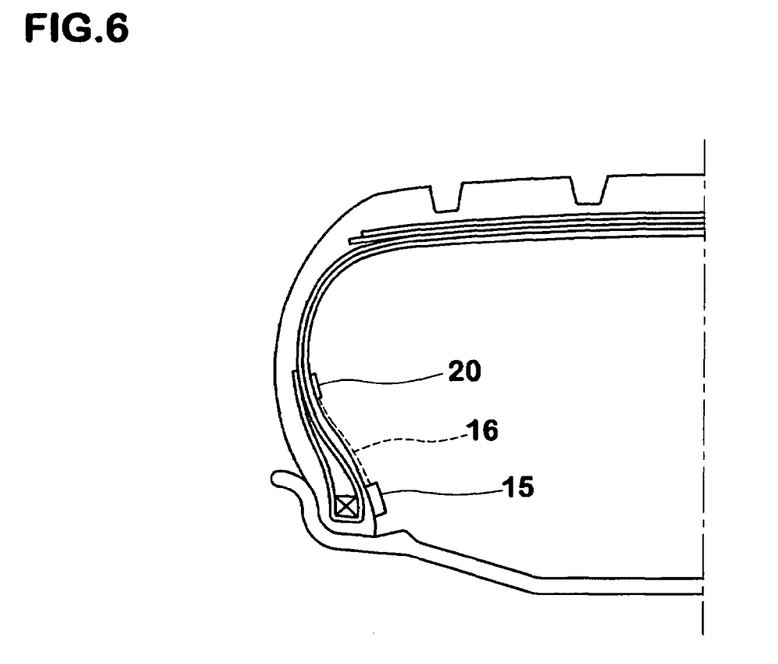
FIG. 6 and FIG. 7 are cross sectional views each showing another example of the mounting positions of the strain sensors.
Figure 7:
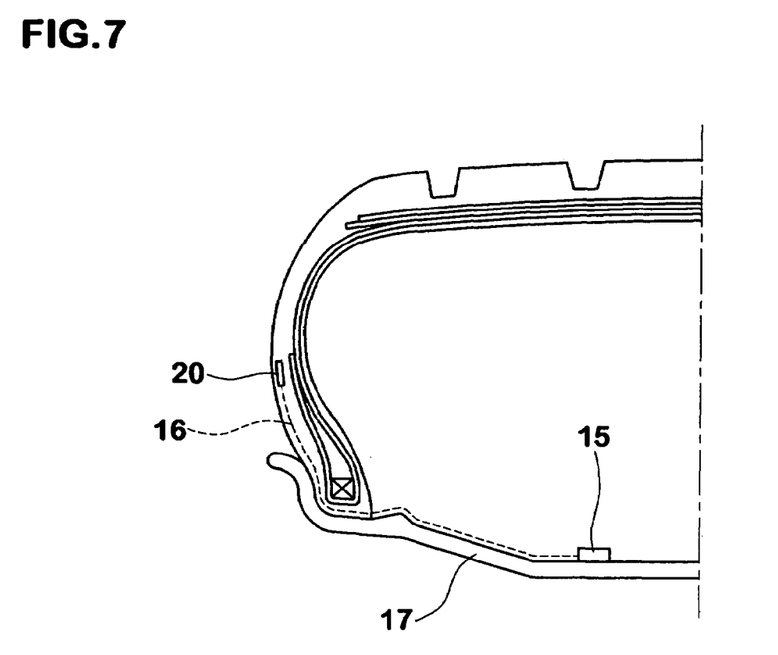

In this embodiment, as shown in FIG. 1, the strain sensors 20 are mounted on or near the outer surface of the sidewall portion 3. But, as shown in FIGS. 6 and 7, the strain sensors 20 can be mounted on the inner surface of the sidewall portion 3 or in the inside of the sidewall portion 3.

In any case, it is preferable that the strain sensors 20 are disposed in place before vulcanizing the tire and fixed to the surface or planted in the sidewall rubber through the vulcanizing process. Of course, it is also possible to fix the sensors to the vulcanized tire using an adhesive agent, press fitting or the like.

Next, a method for determining tire force is explained. The concept of the method is essentially same as that of the above-mentioned US patent. In brief, when a resultant force F of the three translational forces Fx, Fy and Fz is applied to the tire, strain S of the sidewall portion 3 measured at a point (p) in the above-mentioned radial range Y can be expressed as follows:

$$S=f(Fx)+f(Fy)+f(Fz).$$

Therefore, when the strain S is linear with respect to the force F, and the sensor output (t) is linear with respect to the strain S, the sensor output (t) can be presented by $$t=A \cdot Fx+B \cdot Fy+C \cdot Fz$$

wherein, A, B and c are numerical constants.

In order to obtain the three translational forces Fx, Fy and Fz, it is necessary to solve at least three simultaneous linear equations with three unknowns Fx, Fy and Fz. Therefore, it is necessary to measure the strain S simultaneously at least three different measuring positions p1, p2 and p3 (not the sensor mounting positions fixed on the tire).

Assuming that the three measured values (or sensor outputs) at the measuring positions p1, p2 and p3 are t1, t2 and t3, the three simultaneous linear equations are expressed as follows:

$$t1 = A1 \cdot Fx + B1 \cdot Fy + C1 \cdot Fz$$

$$t2 = A2 \cdot Fx + B2 \cdot Fy + C2 \cdot Fz$$

$$t3 = A3 \cdot Fx + B3 \cdot Fy + C3 \cdot Fz$$

wherein

A1 to A3, B1 to B3, and C1 to C3 are numerical constants bound on the measuring positions p1, p2 and p3.

In the above-mentioned us patent, since all of the sensors are oriented towards the same directions, the numerical constants A, B and C (A1-A3, B1-B3, C1-C3) are not peculiar to the sensors.

In the present invention, however, the numerical constants are peculiar to the sensors as far as they are differently orientated. In other words, with respect to each of the measuring positions p1, p2 and p3, plural sets of the numerical constants A, B and C are prepared, and one of the sets is selected, depending on the orientation of the sensor which becomes located at the measuring position. Therefore, in the following determinant to obtain Fx, Fy and Fz from t1, t2 and t3, the numerical constants A, B and C, should be selected, using data on the position and the orientation of the sensor.

$$\begin{bmatrix} Fx \\ Fy \\ Fx \end{bmatrix} = \begin{bmatrix} A1 & B1 & C1 \\ A2 & B2 & C2 \\ A3 & B3 & C3 \end{bmatrix}^{-1} \begin{bmatrix} t1 \\ t2 \\ t3 \end{bmatrix}$$

Incidentally, the numerical constants are determined in advance by analyzing data obtained through a preliminary examination, wherein the outputs t1, t2 and t3 of each sensor are measured by varying each of the forces Fx, Fy and Fz while keeping the remaining two at zero. The numerical constants are stored in a memory together with data of the measuring positions and orientation angles.

As to the strain sensor 20, a wire resistance strain gauge, a piezoelectric element and the like which receives a stress and itself deforms, may be used. But, a combination of a magnet and a magnetometric sensor element is preferred because of the sensibility and easy control of the directivity. Thus, in this embodiment, the strain sensor 20 is made up of at least one magnet 11 and at least one magnetometric sensor element 12 placed in the magnetic field of the magnet(s) 11. The magnet(s) 11 and element(s) 12 are embedded in an elastic material 13 so that their geometrical arrangement can be changed by the stress applied to its casing of the elastic material. As to the magnetometric sensor element 12, various types of elements, e.g. hall elements, magnetoresistive elements, TMF (Thin-film Magnetic Field) sensors, amorphous sensors and the like can be used. In this embodiment, hall elements are used. As to the elastic material 13, various materials can be used as far as it can be deformed following the deformation of the sidewall portion 3. For example, a thermoplastic elastomer (TPE) is preferably used because plastics molding such as casting and injection molding is possible.

Figure 8:
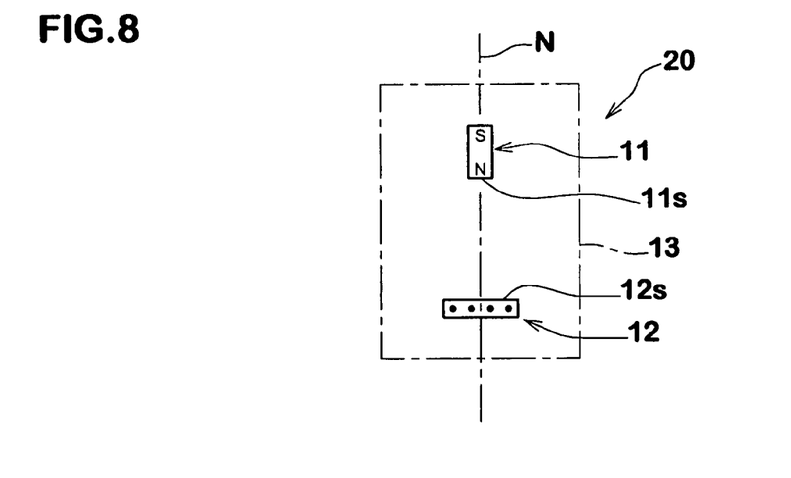
FIGS. 8, 9 and 10 are diagrams showing examples of the strain sensor.
Figure 9:
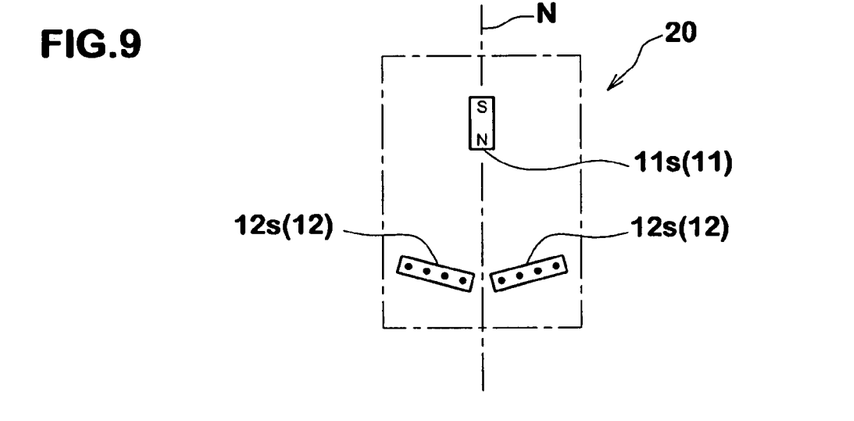
Figure 10:
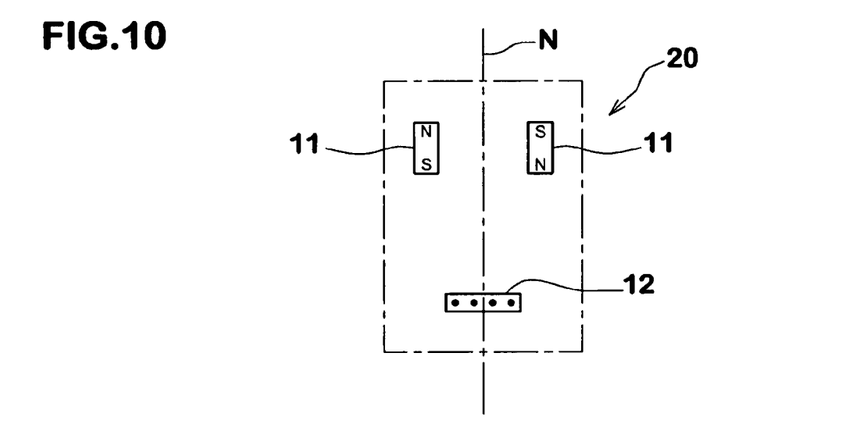

An example of the sensor 20 made up of one magnet 11 and one sensor element 12 is shown in FIG. 8. An example made up of one magnet 11 and a plurality of sensor elements 12 is shown in FIG. 9. An example made up of a plurality of magnets 11 and one sensor element 12 is shown in FIG. 10. In these examples, the sensor face 12s of each of the magnetometric sensor elements 12 is pointed at one of the magnet's poles 11s, while leaving space therebetween. As a result, the strain sensor 20 has the most sensitive direction N to linear strain in the direction parallel to the direction N. As the strain sensor 20 is fixed so that the direction N becomes substantially parallel to the outer or inner surface of the tire, therefore, the sensor detects linear strain in a plane parallel to the outer or inner surface.

Figure 11:
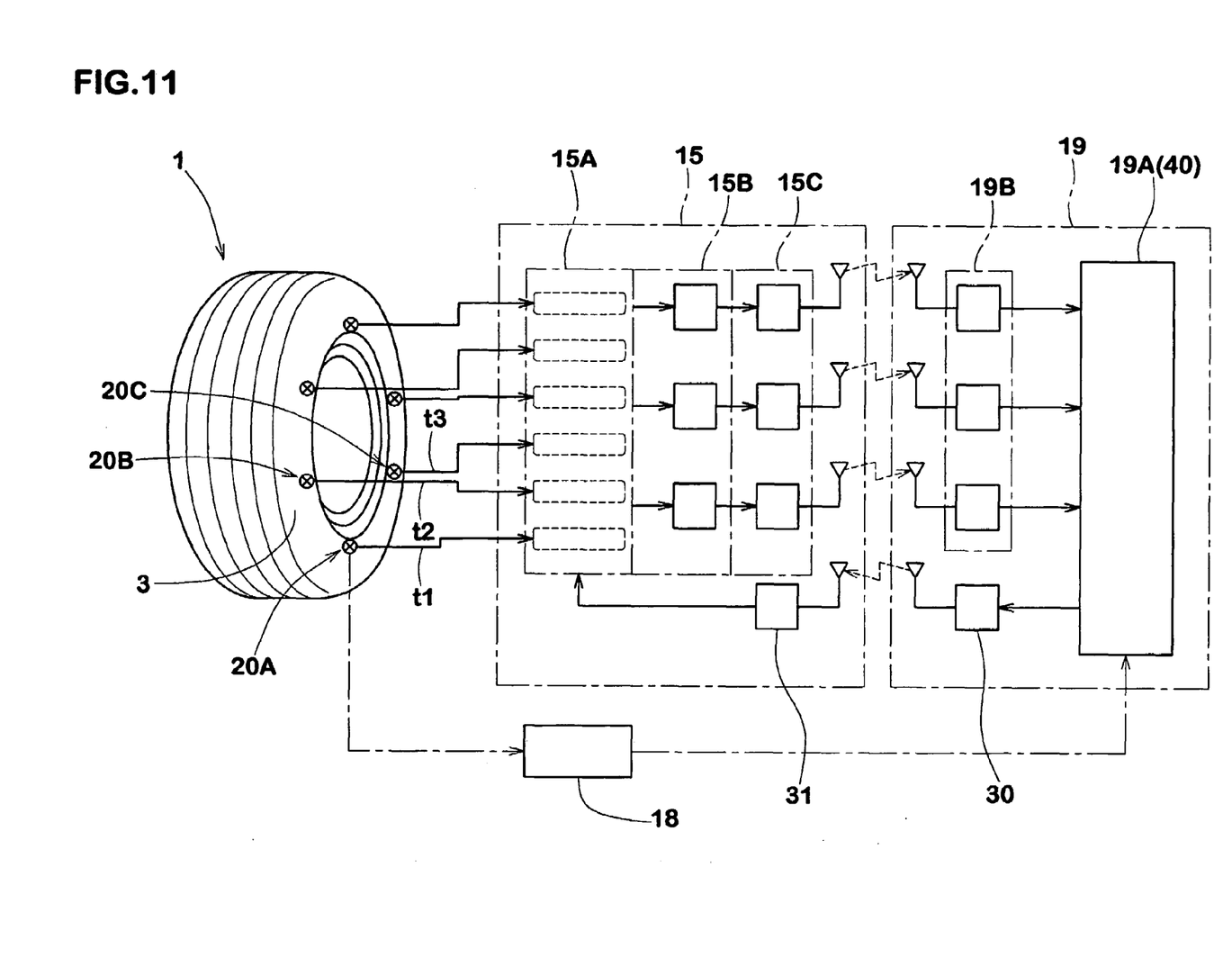
FIG. 11 is a diagram for explaining a system and a method for determining tire force.

FIG. 11 shows a system for determining tire force according to the present invention, which is incorporated in a vehicle controlling system 19 such as ABS (Anti Lock Brake System), TCS (Traction control system), VSC (vehicle stability control System) and the like.

In this example, the tires 1 of a vehicle are each provided on one of the sidewall portions 3 with six strain sensors 20 at regular intervals in the tire circumferential direction. The strain sensors 20 of a tire are connected to a sensor data controller 15 disposed in the tire.

In this example, when three of the six strain sensors 20 come to the predetermined three fixed measuring positions around the tire rotational axis (for example, angular positions p1, p2 and p3 of −60, 0 and +60 degrees, wherein 0 degree is the just downward direction. See FIG. 5), the sensor data controller 15 sends data on the sensor outputs t1, t2 and t3, together with data identifying the sensors, to a processor 19A of the vehicle controlling system 19 disposed on the vehicle.

The sensor data controller 15 in this example comprises:

an A-D converter 15A converting the analog outputs of the sensors to digital data and combining the digital data and the sensor identification data;

a selector 15B selecting the converted data of the strain sensors 20A, 20B and 20C which are just positioned at the above-mentioned three fixed positions p1, p2 and p3 from the six sensors according to position data on a rotational position or angle of the tire determined by the rotational position sensing device 18;

a transmitter 15C of the selected data.

The vehicle controlling system 19 comprises:

a receiver 19B receiving the data on the sensor outputs t1, t2 and t3 and sensor identifying data sent from the sensor data controller 15 and outputting them to the processor 19A;

the processor 19A selecting the numerical constants A, B and C by the use of the sensor identifying data and the position data, preparing the above-mentioned determinant using the selected numerical constants A, B and C, and computing the prepare determinant by the use of the data on the sensor outputs t1, t2 and t3 and outputting the three translational forces Fx, Fy and Fz; and a vehicle control mechanism, e.g. brake system, transmission system, attitude control system, or the like and an actuator therefor driven according to the forces Fx, Fy and Fz.

The data on the rotational position or angle of the tire determined by the rotational position sensing device 18 is sent to the selector 15B through the processor 19A, a transmitter 30 and a receiver 31 and utilized to select the strain sensors 20A, 20B and 20C.

The lead wires 16 between the strain sensors 20 and the sensor data controller 15 are prepared by embedding the wires in the tire before vulcanizing the tire. The sensor data controller 15 is fixed to the inner surface of the vulcanized tire or the wheel 17 (for example the bottom of the rim well) by means of an adhesive agent, mounting bracket or the like.

As to the electric power supply (not shown) for the devises on the tire, preferable used is a combination of a storage cell and a charger which can convert an electromagnetic wave which is transmitted from a device provided on the vehicle-side and outputs a direct current for charging the storage cell.

Comparison Tests

Pneumatic tires of size 225/55R17 provided with strain sensors were prepared and tested for the accuracy of the computed forces Fx, Fy and Fz.

The test tires were identical, excepting the arrangements of the strain sensors. The strain sensors were fixed to the outer surface of one or each of the sidewall portions at the maximum tire section width position at regular intervals in the tire circumferential direction. The specifications are shown in Table 1.

Each test tire was mounted a wheel rim 17×7JJ and inflated to 200 kPa. Then, a longitudinal force, lateral force, vertical force were applied to the tire, and the strain was measured with the strain sensors. From the measured strain data, the longitudinal force, lateral force, vertical force Fx, Fy, Fz were derived by computing the above-mentioned determinant. The percent error of the computed forces from the actual forces applied was calculated. The results are shown in Table 1, wherein the percent error is indicated as follows:

TABLE 1

| Tire | Ref. 1 | Ref. 2 | Ref. 3 | Ex. 1 | Ex. 2 |
|---|---|---|---|---|---|
| Sensors | | | | | |
| Mounted on one or each of Sidewalls | one | one | one | one | each |
| Number per Sidewall | 2 | 3 | 6 | 6 | 6 |
| Angles θ (deg.) | +45 constant | +45 constant | +45 constant | +45, 0, −45 | +45, 0, −45 |
| Accuracy | | | | | |
| Longitudinal force | D | C | B | A | A |
| Lateral force | D | C | C | C | B |
| Vertical force | D | C | B | A | A |

A: not more than 10%
B: more than 10% but not more than 20%
C: more than 20% but not more than 50%
D: more than 50%

The invention claimed is:

1. A pneumatic tire comprising
a tread portion,
a pair of bead portions, and
a pair of sidewall portions,
at least one of the sidewall portions provided with at least three strain sensors disposed at least three mounting positions, respectively,
said at least three mounting positions arranged around the tire rotational axis at intervals in the tire circumferential direction,
said at least three strain sensors oriented at angles θ with respect to tire radial directions at the respective mounting positions, wherein the orientation angle θ is defined as being a plus value when oriented towards one tire circumferential direction, and a minus value when oriented towards the other tire circumferential direction, wherein
the orientation angles θ of at least two of said at least three strain sensors are different from one another and their difference(s) is(are) not less than 20 degrees in absolute value.

2. The pneumatic tire according to claim 1, wherein
the orientation angle θ of each of the strain sensors is in a range of −80 to +80 degrees.

3. The pneumatic tire according to claim 1, wherein
with respect to each of said at least three strain sensors, the remainder thereof includes zero or only one sensor whose difference in the orientation angle θ therefrom is less than 20 degrees in absolute value.

4. The pneumatic tire according to claim 1, wherein
differences in the orientation angle θ between the circumferentially adjacent strain sensors are not less than 30 degrees in absolute value.

5. The pneumatic tire according to claim 1, wherein
said at least three mounting positions are in the maximum tire section width position of the sidewall portion or alternatively on the radially inner side thereof.

6. The pneumatic tire according to claim 1, wherein
one of the sidewall portions is provided with said at least three strain sensors, and
the other sidewall portion is also provided with at least three strain sensors,
the strain sensors of the other sidewall portion are disposed at mounting positions circumferentially different from those of the strain sensors of one sidewall portion.

7. The pneumatic tire according to claim 6, wherein
the number of the strain sensors of one sidewall portion is the same as the number of the strain sensors of the other sidewall portion.

8. The pneumatic tire according to claim 1, wherein
in the strain sensors oriented at the angles θ, their most sensitive directions to linear strain are at said angles θ.

9. A method for determining a tire force exerted on the pneumatic tire according to claim 1, comprising
obtaining: strain data on strain at predetermined fixed measuring positions around the tire rotational axis, from the strain sensors; identification data identifying the strain sensors; and position data on the positions of the strain sensors,
repapering a determinant for calculating the tire force according to said identification data, and
computing the determinant using the strain data to determine the tire force.

* * * * *